United States Patent [19]

Kawai et al.

[11] Patent Number: 4,941,397
[45] Date of Patent: Jul. 17, 1990

[54] PISTON ASSEMBLY FOR INTERNAL COMBUSTION ENGINE

[75] Inventors: Makoto Kawai; Kazuhito Nakamura; Minoru Kageyama, all of Hamamatsu, Japan

[73] Assignee: Suzuki Jidosha Kogyo Kabushiki Kaisha, Japan

[21] Appl. No.: 283,211

[22] Filed: May 18, 1989

[30] Foreign Application Priority Data

Dec. 11, 1987 [JP] Japan ................... 62-312109

[51] Int. Cl.$^5$ .................................. F16J 1/04
[52] U.S. Cl. ...................... 92/223; 92/222; 29/888.042; 29/888.048; 123/193 P
[58] Field of Search ............ 92/187, 208, 216, 222, 92/223, 234, 235; 403/150, 151, 152, 161; 29/156.5 A; 123/193 P

[56] References Cited

U.S. PATENT DOCUMENTS

| 3,203,321 | 8/1965 | Rosen | 92/223 |
| 3,324,772 | 6/1967 | Wittstock | 92/222 |
| 3,405,610 | 10/1968 | Hill et al. | 92/223 |
| 3,911,891 | 10/1975 | Dowell | 92/223 X |
| 4,578,849 | 4/1986 | Kaufman | 29/156.5 A |
| 4,645,716 | 2/1987 | Harrington et al. | 92/223 X |

FOREIGN PATENT DOCUMENTS 1583349 1/1981 United Kingdom ............. 92/223

Primary Examiner—Robert E. Garrett
Assistant Examiner—Thomas Denion
Attorney, Agent, or Firm—Bruce L. Adams; Van C. Wilks

[57] ABSTRACT

A piston member for an internal combustion engine of, for example, a motor bicycle is provided with bosses having inner end surfaces opposing to each other into which a piston pin is inserted. A connecting rod has small and large end portions and the small end portion is slidably coupled with the end surfaces when the connecting rod is inserted into the body of the piston member through a cutout portion formed at one end thereof to form a skirt portion. The sizes, dimensions, and structures of the end surfaces of the bosses, the cutout portion, and the associated elements are determined to be suitable for coating thin films of metallic particles on the end surfaces by flame coating means.

11 Claims, 3 Drawing Sheets

PISTON ASSEMBLY FOR INTERNAL COMBUSTION ENGINE

BACKGROUND OF THE INVENTION

This invention relates to a piston assembly for an internal combustion engine of a motor bicycle, for example.

The piston assembly for an internal engine of a motor bicycle, for example, is provided with piston bosses with which a connecting rod, so-called a con'rod, is coupled through a piston pin. The connecting rod is provided with a small end portion generally in direct contact with the end surfaces of the piston bosses to adjust or limit the position of the small end portion of the connecting rod and with a big end portion operatively coupled with a crank shaft.

In a modification, there has been proposed a piston for an internal combustion engine in which a washer or sleeve member is interposed between the small end portion of the connecting rod and the end surfaces of the piston bosses to indirectly adjust or limit the position of the small end portion of the connecting rod.

With the pistons of the described types, a deflection or swinging motion of the connecting rod is caused during the reciprocating displacement of the piston, so that the piston boss is subjected to direct or indirect, through the washer, for example, sliding and colliding friction forces by the connecting rod. Such sliding and colliding friction forces may cause the sliding and colliding abrasion or wear to the end surfaces of the piston bosses simultaneously, which may result in breakage of the engine in an adverse case.

In order to obviate the defects described above, there has been also provided a piston for an internal combustion engine in which a thin film of a chrome plating with high hardness is adhered to the end surface of the piston boss to effectively prevent the abrasion or wearing of the end surface of the piston boss. Such chrome plating is effective against the sliding or colliding abrasion or wearing, but in the conventional technique, it is necessary to carry out a finishing cutting or grinding working after the adherence of the thin film of the chrome plating. This impedes the mass production of the piston assembly.

Moreover, in the technical field for plating or coating metal powder of particles, there is known a flame coating methods, but the known flame coating method has not been utilized for coating the end surfaces of the piston bosses of the piston member of a motor bicycle, for example, of the type described above, because of the design, the dimensions, and the structure of the conventional piston member.

SUMMARY OF THE INVENTION

An object of this invention is to substantially eliminate the defects or drawbacks of the prior art described above and to provide a piston assembly having a superior resistance to abrasion or wearing of the end surfaces of the piston bosses thereby improving the durability of the piston assembly and the mass-productivity thereof.

This and other objects can be achieved according to this invention by providing a piston assembly for an internal combustion engine, for example, of a motor bicycle, comprising a piston body, bosses formed in the piston body through which a piston pin is inserted and with which a connecting rod provided with small and large end portions is coupled, the bosses being provided with end surfaces with which the small end portion of the connecting rod is slidably engaged, and a skirt portion formed by cutting out an end portion of the piston body for enabling insertion of the connecting rod, the end surfaces of the bosses being coated with a thin film by flame coating mass. The thin film is preferably formed with metallic particles endowed with high hardness and self-lubricating properties.

In the preferred embodiment, an width of the cutout portion of the skirt portion has an inner diameter larger than an outer diameter of the boss and the bosses and the skirt portion are disposed in a positional relationship such that either one angle of an angle constituted by a line connecting a most inward end portion, with respect to the skirt cutout portion, of one end surface of the one boss and a most outward end portion of the other end surface of the other boss with respect to the former mentioned end surface and an angle constituted by a line connecting the most inward end portion of the boss and an inner peripheral end of the skirt cutout portion with respect to the former mentioned end surface is made smaller with respect to the other angle, the smaller angle being below about 40 degrees.

According to the piston assembly having the structure described above, the end surfaces of the bosses of the piston body are effectively coated with a thin flame-coated film of metallic material with high hardness and self-lubricating property by a flame coating method to strengthen the end surfaces, so that the abrasion or wearing thereof can be effectively prevented when the end surfaces are subjected to the sliding friction and deformation or swinging friction due to the motion of a connecting rod. The formation of the thin film by means of flame coating does not require the cutting or grinding workings after the coating, thus improving the mass-productivity of the piston assemblies.

The preferred embodiments according to this invention will be described further in detail hereunder with reference to the accompanying drawings.

DESCRIPTION OF THE PREFERRED EMBODIMENTS

Figure 1:
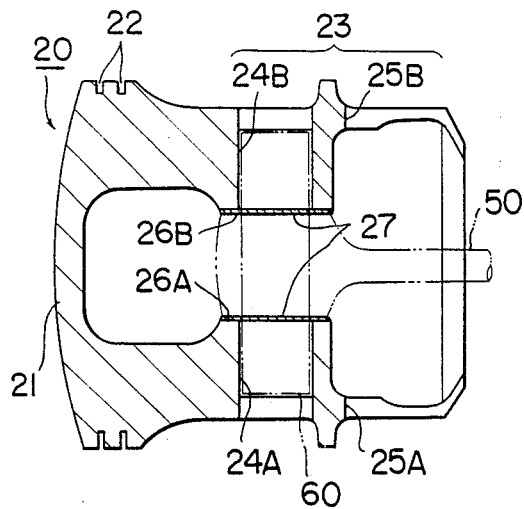
FIG. 1 shows a longitudinal sectional view of one embodiment of a piston assembly for an internal combustion engine according to this invention.

Referring to FIG. 1, showing the sectional view of a piston assembly of an internal combustion engine according to this invention, a piston member or assembly 20 is provided with a piston head 21 having an outer surface in which circumferential grooves 22 are formed and with a skirt portion 23 in which piston bosses 24A and 24B and cutouts 25A and 25B are formed. The piston bosses 24A and 24B have bores formed therein and are disposed in opposing relation to each other with the bores in axial alignment, and the cutouts 25A and 25B are also disposed in opposing relation in the same direction as the arrangement of the piston bosses.

The piston bosses 24A and 24B are provided with opposed inner end surfaces or faces 26A and 26B, respectively, between which a small end portion of a connecting rod, so-called con'rod, imaginarily designated by reference numeral 50 in FIG. 1, is fitted. The connecting rod is slidably connected to the piston assembly 20 by inserting a piston pin, imaginarily designated by reference numeral 60 in FIG. 1, into the piston bosses 24A and 24B. In a modification, a washer or the like member may be interposed between the small end portion of the connecting rod and the end surfaces 26A and 26B of the piston bosses. Flame-coated films 27 are formed on the end surfaces or faces 26A and 26B of both the piston bosses. The flame-coated films 27 are formed by flame-jetting metal particles such as molybdenum, graphite, boronnitride or metal including such elements, which possess a self-lubricating property and high hardness.

Figure 5:
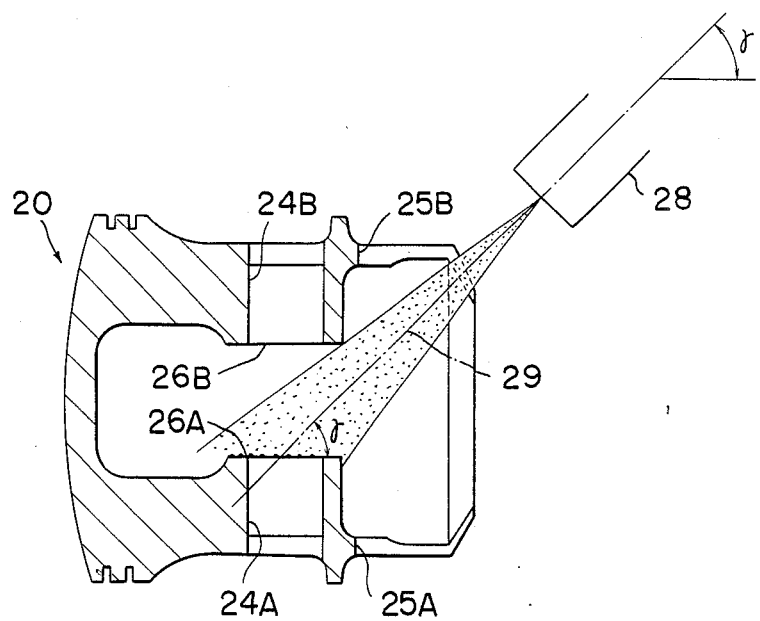
FIG. 5 is a sectional view of the piston assembly in condition of the flame-coating treatment.
Figure 6:
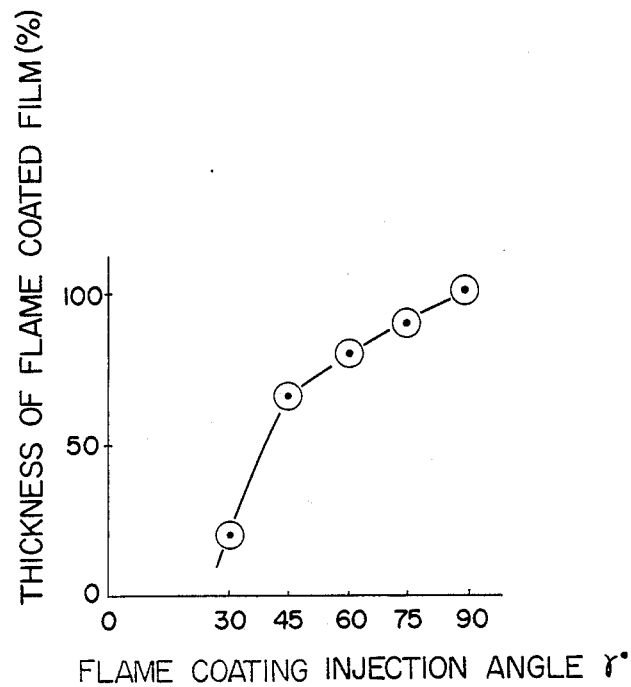
FIG. 6 shows a graph representing the relationship between the flame-coating jetting angle and the thickness of the flame-coated film.
Figure 7:
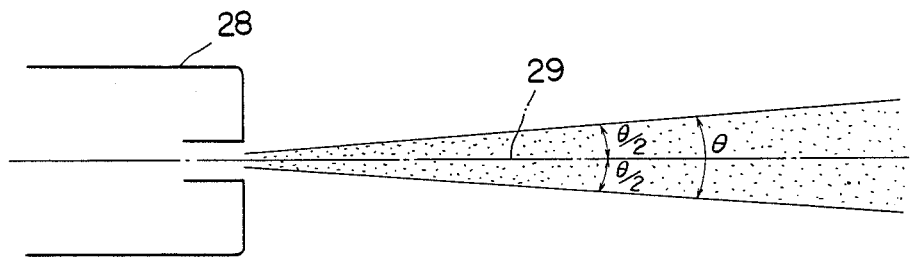
FIG. 7 is an illustration showing the jetting condition of the flame-coating material from a nozzle member.

FIG. 5 is a view of the piston assembly for explaining a general method for forming a flame-coating film 27, in which the angle of a flame-coat jetting nozzle 28 is set to an angle of $\gamma$ with respect to the end surfaces or faces 26A and 26B. The thickness of the coated film rapidly increases, as shown in FIG. 6, when the flame-coating angle is beyond the angle $\gamma$ of 45 degrees and hence the flame coating efficiency also increases. FIG. 6 shows a graph representing the relationship between the flame-coating angle and the thickness of the flame-coated film, in which the thickness of the film 27 flame-coated by the flame-coating angle $\gamma$ of 90 degrees is represented by numeral 100 for convenience sake. The flame-coating particles are jetted, as shown in FIG. 7, at a jetting angle of $\theta$, i.e. $\theta/2$ with respect to the axis 29 of the coating nozzle 28 ($\theta < 5$ degrees).

Figure 2:
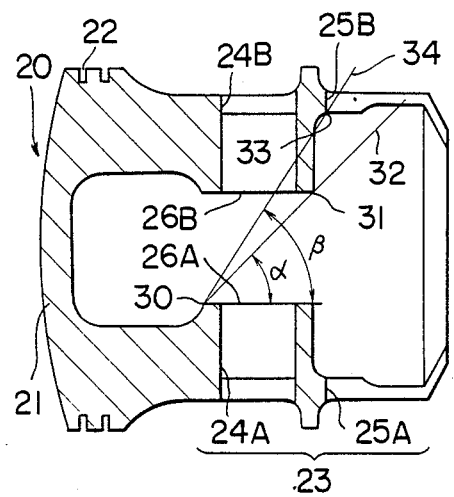
FIG. 2 shows a view similar to that shown in FIG. 1 in a condition before the formation of a flame-coated film.

Referring to FIG. 2, an angle $\alpha$ is constituted by a line connecting the most inward, leftward as viewed, end portion 30 of the end surface 26A of the piston boss and the most outward, rightward as viewed, end portion 31 of the end surface 26B of the piston boss with respect to the end surface 26A of the piston boss. An angle $\beta$ is constituted by a line 34 connecting the most inward end portion 30 and the inner peripheral end 33 of the cutout portion 25B with respect to the end surface 26A of the piston boss. The angle $\alpha$ which is smaller than the angle $\beta$ is set to be larger than an angle of about 40 degrees, i.e. $40 \leq \alpha \leq \beta$, according to this embodiment. The definition of this angular relationship is an essential matter for effectively carrying out the flame-coating jetting of the flame-coating particles to the piston boss end surfaces in the axial direction thereof.

Figure 3:
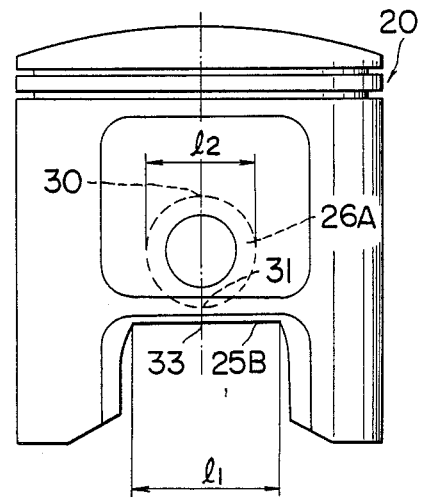
FIG. 3 is a front view of the piston assembly prior to the formation of the flame-coated film.

In order to effectively carry out the flame-coating jetting in a diametrical direction of the piston 20 to the end surfaces 26A and 26B of the piston bosses, it is necessary to design the width $l_1$ of the opening of each cutout portion 25A or 25B of the skirt portion 23 of the piston 20 to be a value more than the outer diameter $l_2$, i.e. $l_1 \geq l_2$, of each of the end surfaces 26A and 26B of the piston bosses, as shown in FIG. 3.

With the design of the piston member satisfying the dimensional conditions in the axial and diametrical directions thereof described above, the flame-coating particles are effectively jetted from the jetting nozzle 28 to thereby coat the thin film 27 to the end surfaces 26A and 26B of the piston bosses through the cutouts 25A and 25B, of the skirt portion 23 which are positioned correspondingly to the end surfaces 26A and 26B. Accordingly, by taking the above facts into consideration, the piston member 20 according to this invention is designed to have the respective dimensions so as to enable the positioning of the nozzle 28 relative to jet the flame-coating particles with the jetting angle $\gamma$ of more than 45 degrees to attain a sufficient flame-coating efficiency.

According to the formation of the flame-coated film 27 on the end surfaces 26A and 26B of the piston boss in accordance with the manner described above, the end surfaces 26A and 26B are strengthened, whereby the abrasion or wearing of these end surfaces can be effectively prevented even if the end surfaces are subjected to the sliding friction force due to the motion of the small end portion of the connecting rod and due to the colliding friction force due to the swinging or deflection motion thereof, and hence, the durability of the piston member 20 can be remarkably improved. In addition, the film 27 is formed by the flame-coating method, so that the cutting or grinding working after the flame-coating can be eliminated, whereby the mass productivity of the piston members can be also improved.

Figure 4:
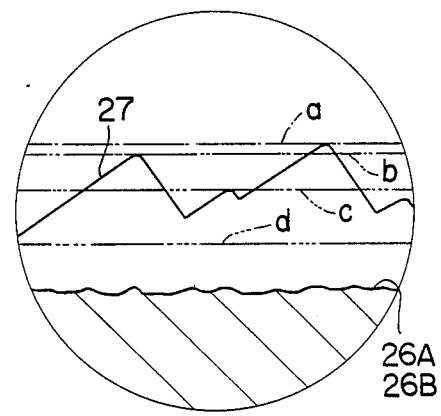
FIG. 4 is an enlarged partial sectional view of the flame-coated film.

Moreover, the fact that the film 27 is formed by the flame-coating method provides the following effect. Namely, a clearance between the end surfaces 26A and 26B of the piston boss and the connecting rod or washer can be automatically adjusted in accordance with the operating condition of the piston member. That is, as shown in FIG. 4, the jet-coated thin film 27 has a sharp or severe irregularity in cross section, and the top portion of the film 27 existing between the lines a and b will be easily cut away by the connecting rod or washer during the initial operation stage of the piston member 20. In the succeeding operation of the piston member, the portions between the lines b and c and between the lines c and d will be cut away, and the surface area of the thin film 27 contacting the connecting rod or washer thus stepwisely increases. According to the manner described above, the clearance between the end surfaces 26A and 26B of the piston boss and the connecting rod or washer can be automatically adjusted or broken in during the initial stage of the operation of the piston member 20.

Furthermore, the coating of the flame-coated film 27 endowed with the self-lubricating ability allows the connecting rod or washer to be free from damage due to the contact with the film 27. In case the worn particles of the film 27 are dropped, the dropped particles never damage the other constructional elements.

According to this embodiment of the present invention, in addition, the flame-coating film formation can be effected after machine working or knock-pin driving, so that the flame-coating process can be effected after the conventional piston working process, which eliminates the unnecessary rising of the manufacturing cost.

Figure 8:
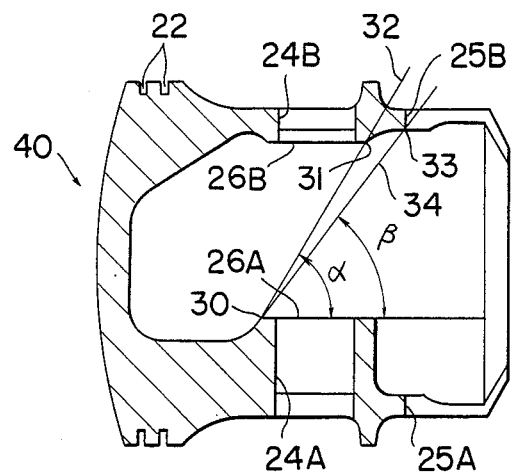
FIG. 8 shows another embodiment according to this invention.

FIG. 8 illustrates a cross section of a piston member 40 of another embodiment according to this invention, in which an angle α is constituted by a line 32 connecting the most inward end portion 30 of the end surface of the piston boss 26A and the most outward end portion 31 of the end surface of the piston boss 26B with respect to the end surface of the piston boss 26A. An angle β is constituted by a line 34 connecting the most inward end portion 30 and the inner peripheral end 33 of the cutout portion 25B with respect to the end surface 26A of the piston boss. The angle β which is smaller than the angle α is set to be larger than an angle of about 40 degrees, i.e. $40 \leq \beta \leq \alpha$, according to this embodiment.

In a modification of this invention, the flame-coated film may be formed on only one of the end surfaces of the piston bosses.

It is to be noted that the piston member according to this invention is not limited to the use for motor bicycles or automobiles, and is applicable to piston members which are operatively coupled with connecting rods of, for example, outboard engines or compressors.

What is claimed is:

1. A piston assembly for an internal combustion engine, comprising:
   a piston body;
   boss means formed in said piston body through which a piston pin is inserted and with which a connecting rod having small and large end portions is coupled, said boss means having end surfaces with which said small end portion of said connecting rod is slidably engaged; and
   a skirt portion formed by cutting out an end portion of said piston body for enabling insertion of said connecting rod,
   at least one of said end faces of the boss means being coated with a thin film by a flame coating process,
   said cutout portion of the skirt portion having an inner diameter larger than an outer diameter of said boss means, and said boss means and said skirt portion being disposed in a positional relationship such that either one angle of an angle constituted by a line connecting a most inward end portion, with respect to the skirt portion, of one end surface of the boss means and a most outward end portion of the other end surface of the boss means, with respect to the former end surface, and an angle constituted by a line connecting said most inward end portion of the boss means and an inner peripheral end of the skirt cutout portion with respect to said former end surface, is made smaller with respect to the other angle.

2. A piston assembly according to claim 1; wherein said smaller angle is below about 40 degrees.

3. A piston assembly according to claim 1, wherein said thin film is formed of a metallic material endowed with high hardness and a self-lubricating property.

4. A piston assembly according to claim 1, wherein said angle constituted by a line connecting a most inward end portion, with respect to the skirt cutout portion, of one end surface of the boss means and a most outward end portion of the other end surface of the boss means with respect to the former end surface is made smaller than said angle constituted by a line connecting said most inward end portion of the boss means and an inner peripheral end of the skirt cutout portion with respect to said former end surface, said smaller angle being below about 40 degrees.

5. A piston assembly according to claim 1, wherein said angle constituted by a line connecting a most inward end portion, with respect to the skirt cutout portion, of one end surface of the boss means and a most outward end portion of the other end surface of the boss means with respect to the former end surface is made larger than said angle constituted by a line connecting said most inward end portion of the boss means and an inner peripheral end of the skirt cutout portion with respect to said former end surface, said smaller angle being below about 40 degrees.

6. A piston for an internal combustion engine comprising: a piston body having a head portion and a skirt portion extending axially rearwardly relative to the head portion; means defining a pair of transversely extending bosses in the piston body, the bosses having respective inner faces in spaced-apart opposed relation to each other and having respective bores in axial alignment with each other, the bosses being suitably spaced apart to receive therebetween one end of a connecting rod which undergoes swinging slidable movement relative to the boss inner faces during use of the piston; and a flame-coated film flame-coated on the opposed inner faces of the bosses, the flame-coated film being composed of a material having lubricating and hardness properties effective to reduce abrasion and wear of the boss inner faces due to swinging slidable movement of the connecting rod during use of the piston.

7. A piston according to claim 6; wherein the skirt portion of the piston body has a pair of cutouts therein in opposed spaced-apart relation from each other, the pair of cutouts being opposed from each other in the same direction as the pair of bosses.

8. A piston according to claim 7; wherein the cutouts are configured and dimensioned to enable the material of the flame-coated film to be deposited through the cutouts onto the boss inner faces during flame coating of the boss inner faces.

9. A piston according to claim 8; wherein the cutouts are configured and dimensioned to enable the material of the flame-coated film to be deposited at an angle of approximately 45 degrees with respect to the boss inner faces.

10. A piston according to claim 8; wherein the flame-coated film includes a material selected from the group consisting of molybdenum, graphite and boronnitride.

11. A piston according to claim 6; wherein the flame-coated film includes a material selected from the group consisting of molybdenum, graphite and boronnitride.

* * * * *